United States Patent
Hollenbacher

(10) Patent No.: US 10,677,666 B2
(45) Date of Patent: Jun. 9, 2020

(54) APPARATUS FOR TESTING SKIS OR SNOWBOARDS

(71) Applicant: Molibso Entwicklungs- und Vertriebs GmbH, Langenfeld (DE)

(72) Inventor: Jens Hollenbacher, Langenfeld (DE)

(73) Assignee: MOLIBSO ENTWICKLUNGS-UND VERTRIEBS GMBH, Langenfeld (DE)

( * ) Notice: Subject to any disclaimer, the term of this patent is extended or adjusted under 35 U.S.C. 154(b) by 0 days.

(21) Appl. No.: 16/060,362

(22) PCT Filed: Dec. 9, 2016

(86) PCT No.: PCT/EP2016/002072
§ 371 (c)(1),
(2) Date: Sep. 14, 2018

(87) PCT Pub. No.: WO2017/097421
PCT Pub. Date: Jun. 15, 2017

(65) Prior Publication Data
US 2019/0017884 A1    Jan. 17, 2019

(30) Foreign Application Priority Data
Dec. 9, 2015   (DE) .................. 10 2015 015 879

(51) Int. Cl.
*G01L 1/14*    (2006.01)
*A63B 69/18*   (2006.01)
(Continued)

(52) U.S. Cl.
CPC .......... *G01L 1/146* (2013.01); *A63B 24/0003* (2013.01); *A63B 69/18* (2013.01);
(Continued)

(58) Field of Classification Search
CPC ................ A63C 11/00; A63B 24/0003; A63B 2220/806; A63B 2071/0647; A63B 69/18; G01L 1/146
See application file for complete search history.

(56) References Cited

U.S. PATENT DOCUMENTS 3,922,908 A    12/1975   Stemsrud et al.
4,290,499 A     9/1981   Luomaranta
(Continued)

FOREIGN PATENT DOCUMENTS

DE    2512279 A    10/1975
DE    3142351 A1    5/1983
(Continued)

*Primary Examiner* — Jonathan M Dunlap
(74) *Attorney, Agent, or Firm* — Andrew Wilford

(57) ABSTRACT

The invention relates to a measuring arrangement (1) for testing skis and snowboards (2) or sports equipment with a planar contact surface, the arrangement comprising a sensor device, onto which at least one ski or snowboard (2) or piece of sports equipment can be laid. The sensor device has a sensor surface (3) which is predominantly sub-divided in a longitudinal and transverse direction into a plurality of sensor-surface sections (4), each of said sensor-surface sections (4) having at least one force sensor which outputs the force acting on the sensor-surface section (4) as an electrical signal that is evaluated by a computer unit (5).

7 Claims, 3 Drawing Sheets

Figure 1:
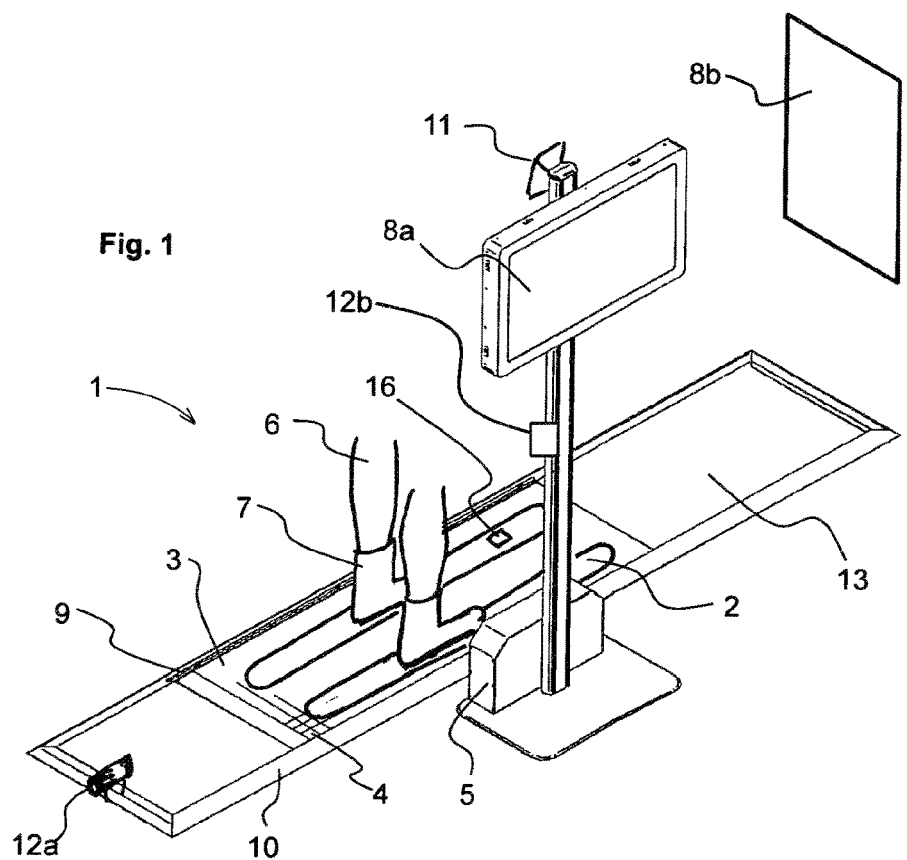

(51) Int. Cl.
*A63B 71/06* (2006.01)
*A63B 24/00* (2006.01)
*A63C 11/00* (2006.01)

(52) U.S. Cl.
CPC . *A63B 2071/0647* (2013.01); *A63B 2220/806* (2013.01); *A63C 11/00* (2013.01)

(56) References Cited

U.S. PATENT DOCUMENTS

| | | | |
|---|---|---|---|
| 4,694,684 A * | 9/1987 | Campbell, III | A63C 11/26 280/809 |
| 4,836,033 A | 6/1989 | Seitz | |
| 4,906,192 A * | 3/1990 | Smithard | A63B 69/00 434/253 |
| 5,202,715 A | 4/1993 | Matsubara | |
| 5,603,617 A * | 2/1997 | Light | A63B 24/0003 434/247 |
| 5,904,484 A * | 5/1999 | Burns | A63B 24/0003 434/252 |
| 5,941,835 A * | 8/1999 | Sundman | A61B 5/1036 600/592 |
| 6,996,891 B1 | 2/2006 | Raisanen | |
| 7,174,793 B2 | 2/2007 | Morimoto | |
| 7,500,393 B2 * | 3/2009 | Kawai | A61B 5/22 702/139 |
| 7,857,708 B2 * | 12/2010 | Ueda | A63B 24/0003 382/103 |
| 7,926,363 B2 * | 4/2011 | Miller | A43B 7/141 73/862.041 |
| 8,002,672 B2 | 8/2011 | Brunner | |
| 9,430,682 B1 * | 8/2016 | Ahmed | G06K 19/063 |
| 9,733,136 B2 | 8/2017 | Seitz | |
| 2001/0037179 A1 | 11/2001 | Vock | |
| 2004/0171432 A1 * | 9/2004 | Van Zyl | A63B 69/3608 473/208 |
| 2005/0223799 A1 * | 10/2005 | Murphy | A61B 5/1124 73/510 |
| 2006/0094523 A1 * | 5/2006 | Hall | A63B 69/3623 473/266 |
| 2006/0192365 A1 * | 8/2006 | Edinger | A63C 9/003 280/611 |
| 2007/0114110 A1 * | 5/2007 | Frost | B65G 43/00 198/502.3 |
| 2007/0219024 A1 * | 9/2007 | Allegre | A63B 69/002 473/422 |
| 2011/0124387 A1 * | 5/2011 | Sauerbrei | A63F 13/213 463/7 |
| 2011/0131012 A1 * | 6/2011 | Czaja | A43B 3/0005 702/188 |
| 2011/0313714 A1 * | 12/2011 | Lieberman | A61B 5/1036 702/139 |
| 2014/0157911 A1 * | 6/2014 | Sarrafzadeh | G06K 9/00342 73/862.041 |
| 2018/0168500 A1 * | 6/2018 | Baleen Preston | A61B 5/7282 |
| 2018/0243158 A1 * | 8/2018 | Loghmani | G16H 10/60 |

FOREIGN PATENT DOCUMENTS

| | | |
|---|---|---|
| DE | 102006005558 A1 | 8/2006 |
| DE | 102007052806 A1 | 5/2009 |
| DE | 102010049154 A | 6/2011 |
| WO | 79/00207 A1 | 4/1979 |

* cited by examiner

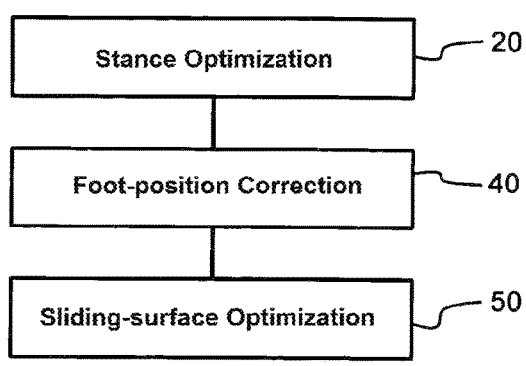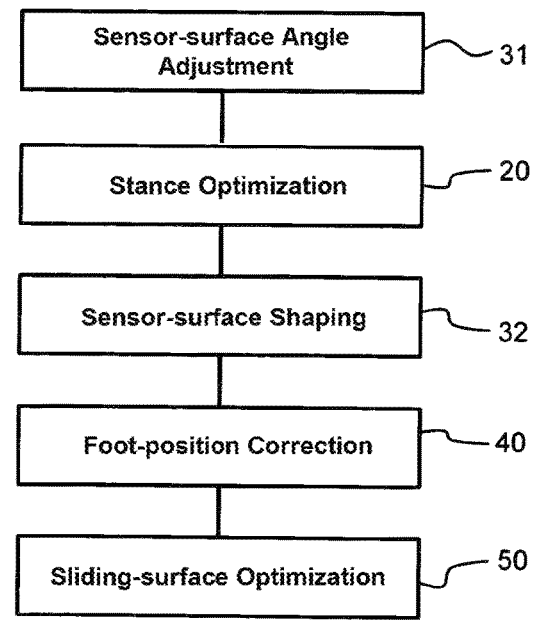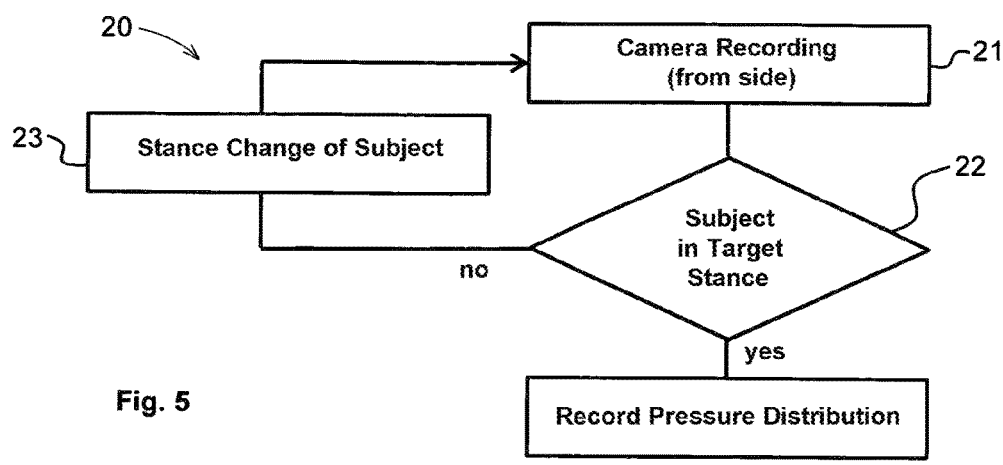

APPARATUS FOR TESTING SKIS OR SNOWBOARDS

CROSS REFERENCE TO RELATED APPLICATIONS

This application is the US-national stage of PCT application PCT/EP2016/002072 filed 9 Dec. 2016 and claiming the priority of German patent application 102015015879.1 itself filed 9 Dec. 2015.

The invention relates to a measuring system for testing a ski or snowboard or sports equipment with a flat contact surface, comprising a sensing apparatus onto which at least one pressure-resistant ski or snowboard can be placed.

The handling characteristics of a ski or snowboard depend, among other things, on how the pressure exerted by a person on the ski or snowboard is distributed over the sliding surface of the ski or snowboard. For example, cross-country skis may benefit if the cross-country skier's weight is evenly distributed over the entire surface of the cross-country ski. The pressure distribution is not only dependent on the nature of the ski or snowboard, but rather results from the combination of ski or snowboard, ski boot, and individual physiological characteristics of the skier or snowboarder. Therefore, it is of particular interest for sporting goods stores and ski shops to be able to test a ski or snowboard in combination with footwear on the spot individually for each customer in order to provide an optimal ski or snowboard for a customer on the basis of measurements.

Patent DE 25 12 279 discloses ski-testing equipment for sporting goods stores and ski shops that measures the torsional stability and pressure distribution of a ski behind its tip and at its rear end. With this testing device, the ski is placed onto two slides, one behind its tip and one at its rear end, and a load is applied with a ram in the middle, in the immediate vicinity of the position of the shoes, and the stiffness of the ski is measured using a hand-operated scale. When selling a ski to a customer, after the desired brand and size are selected, the ski or snowboard is placed on the test device and loaded with the ram until the ski or snowboard rests on an electrical contact switch in the middle part. When the contact switch is touched, the weight applied to the scale should correspond to the weight of the rider in order to ensure that the customer achieves a maximally uniform pressure distribution when using the ski.

U.S. Pat. No. 4,290,499 describes another design variant of a testing device for skis in which a ski is placed on a support surface having a plurality of feeler plates with microswitches. As soon as the board rests on the support surface, it is centrally loaded via a ram and the applied weight is measured. The microswitches switch at a preset pressure and register whether the ski is resting in the area of the microswitch with the appropriate pressure or, due to the bias of the ski, exerts less pressure or is not in contact with the support surface. Typically, the ski is loaded with a pressure equal to the weight of the person who wishes to purchase this ski. While the customer is applying a load on the ski, a measurement is performed by the microswitch to determine at which areas of the ski a desired pressure is generated when the load is on the support surface. In this way, an optimal ski can be identified individually for the customer.

It is the object of the invention to provide a measuring system and a measuring method of testing a ski or snowboard that make it possible, in a simple manner and with little expenditure of time, to reproducibly determine a force/area distribution and/or pressure distribution of a loaded ski or snowboard at high resolution in the longitudinal and transverse direction, particularly for the purpose of customizing a ski or snowboard or footwear individually for a person.

This object is achieved according to the invention by a measuring system with the technical features of claim 1. A method with the features of claim 17 for achieving the object according to the invention is also provided.

The measuring system for achieving the object is characterized in that the ski or snowboard can be loaded at least in portions with a pressure generated by the weight of a person, and the sensing apparatus has a surface that is mostly subdivided into a plurality of sections in the longitudinal and transverse directions, with each of the sections having at least one force sensor that outputs an electrical signal that corresponds to a force generated by the person and that can be evaluated by a computer.

The surface extends longitudinally and transversely, and the ski or snowboard can be preferably placed with its longitudinal direction in the longitudinal direction of the surface. In the following, the terms "front" and "rear" define locations in the direction of travel of the ski or snowboard.

The surface is mostly subdivided into sections in the longitudinal direction and in the transverse direction, and the force acting on the section is measured for each section by a respective force sensor. Because the surface is subdivided into a plurality of sections in both directions, the force acting on the surface is determined as a function of location and outputted as an electrical signal. The computer evaluates the electrical signals of the individual sections so that, for example, a spatially resolved force/area distribution is to be determined by the computer. The force/area distribution can be used, in consideration of the surface area of a section, to determine a pressure distribution for the entire surface.

The subdivision of the surface in the longitudinal and transverse direction and into a plurality of sections offers the advantage that it is possible in this way to determine the force distribution and/or pressure distribution that is generated by the ski or snowboard being tested both in the longitudinal and in the transverse direction of the ski or snowboard in a spatially resolved manner. Advantageously, deformations of the ski or snowboard can be measured two-dimensionally under load.

In one customer-friendly aspect, the invention allows the ski or snowboard to be loaded in portions from above with a pressure and/or a force that a person generates by his/her weight.

Since the measuring system according to the invention is embodied such that a ski or snowboard can be put in place and loaded in sections by a person, a measurement of the force/area distribution and pressure distribution can be performed that is generated by a combination of person and ski or snowboard. The area above the surface is open, so a person with ski or snowboard has space and can access the surface without obstruction.

Advantageously, this enables an individual measurement of a ski or snowboard to be performed as a function of the person who is exerting a load on the ski or snowboard so that the measuring system can be especially preferably used in sporting goods stores and ski shops in order to make an individual selection of a ski or snowboard or customize the ski or snowboard for the person. In particular, the measuring system also enables a ski or snowboard to be adapted and prepared immediately in competitive situations.

According to one especially preferred embodiment of the invention the ski or snowboard has at least one piece of footwear that receives at least one of the person's feet. This footwear is particularly at least one ski boot that is mounted on the ski or snowboard. This embodiment of the invention offers the advantage of not only enabling the individual physiological characteristics of the person to be determined, but also the influence of footwear on the force/area distribution and/or pressure distribution of the ski or snowboard. Based on the determined force/area distribution, not only the ski or snowboard, but also the footwear can then be individually adjusted to fit the person. Particularly where individual buying assistance is being provided in a sporting goods and ski shop, this offers the advantage that relevant components can be optimally matched to one another on the spot. Particularly in the case of ski boots, which are typically composed of a boot and a binding to the ski or snowboard, it is possible to adjust the pressure distribution by adjusting the binding and/or the boot, particularly also by selecting or modifying insoles for the area of application.

In an especially preferred embodiment of the invention, the ski or snowboard is particularly an alpine ski, a cross-country ski, a snowboard, or a jumping ski. The measuring system according to the invention thus makes it possible to measure a ski or snowboard, for whose handling characteristics the pressure distribution is of critical importance.

A variant of the invention, which is preferably used for a ski or snowboard, is characterized in that the surface has a longitudinal length of from 75 cm to 300 cm and a transverse width of from 40 to 150 cm. Such dimensions of the surface make it possible to measure a standard full-length ski or snowboard either individually or in parallel.

In another embodiment of the invention, the surface has 8 to 1000, particularly 20 to 500 sections per $dm^2$. Such a number of sections per $dm^2$ allows for sufficient spatial resolution of the force/area distribution and/or pressure distribution. In particular, differences in pressure distribution in the transverse direction of the ski or snowboard can be detected at such a resolution. This enables a person's individual physiological differences to be measured. Particularly, such a spatial resolution is also sufficient to measure production-related deformations of a ski or snowboard.

The sections can have any desired geometry, with it being possible for circular, elliptical, or polygonal sections to be provided. However, it has been found that sections are preferably rectangular or square and, in particular, have a width of from 1 mm to 30 mm. According to a preferred embodiment of the invention the surface resolves a pressure measurement range of from 0 to 80 $N/cm^2$, especially preferably from 0 to 40 $N/cm^2$. Such a pressure measurement range enables pressures to measured that are typically produced on the sliding surfaces by a ski or snowboard that are supporting an average person. In particular, the pressure measurement range of from 0 to 80 $N/cm^2$ is also sufficient to detect dynamic loads on the sliding surfaces.

In a preferred embodiment, the force sensors are capacitance sensors, resistive sensors, piezoelectric sensors, and/or thin-film sensors. Such sensors can be flat, thus enabling a surface according to the invention to be realized from these sensors. It has been found that capacitance sensors in particular are to be preferably used as force sensors due to their sensitivity, robustness, and large-scale applicability.

According to a further embodiment of the invention the computer is connected to a controller and/or first display, with the first display being set up for the purpose of outputting the force/area distribution and/or pressure distribution that is exerted by the pressure-loaded ski or snowboard on the surface. In this way, it is possible to assess and evaluate the measured force/area distribution in the immediate vicinity of the surface. This offers the advantage that, particularly in sporting goods stores and ski shops, quick and immediate guidance and/or customization of the ski or snowboard and/or footwear can be provided.

One customer-friendly variant of the invention is characterized in that the first display and/or an additional second display are set up so that the person can see them. In particular, the first display and/or the second display are arranged in the longitudinal direction in front of the surface so that a view normal of the display surface is oriented perpendicular to the surface. Such an arrangement ensures that the person who is on the surface can see the measured force/area distribution directly and thus has the result of the measurement in front of him/her. The display is a screen or a projection. Alternatively, a pair of data glasses can also be used as a display, for example.

According to another embodiment of the invention, a segmented lighting element is adjacent the surface in the longitudinal direction. The segmented lighting element can be used, for example, to display a desired position of the footwear or to visually represent a maximum of the force/area distribution in the longitudinal direction. This offers the advantage that the person can assume an optimal position for the measurement. In addition, in this way, a force/area distribution in the longitudinal direction can be represented directly by a variation in the luminous intensity and/or the color of the light segments for the customer or the seller.

Another embodiment of the invention is characterized in that the measuring system has a projector that projects an image onto the surface. Such a projector enables a predefined target position for the footwear to be represented. In addition, a projector can be used to display the measured pressure distribution directly on the surface. This offers the advantage of being able to link a measurement result with the point of measurement, thus making it easier to understand for the customer and the vendor.

According to another variant of the invention, at least one laser is arranged above the pressure plate. This is preferably used to display information such as the center of pressure or the preferred axis of the thigh or lower leg. For this purpose, the laser is guided so as to be maneuverable and/or pivotal.

Alternatively to the projection, another variant of the invention is characterized in that the pressure plate has a flat display that is an OLED film, for example, and integrated into the surface of the pressure plate.

In a preferred variant the measuring system has at least one front camera in front of and/or behind the surface relative to the longitudinal axis thereof so that a ski or snowboard, the footwear, and/or the person can be recorded particularly in the longitudinal direction from the front and/or from the rear. The use of a front camera, which is positioned laterally to the surface, makes it possible to record the position of the person relative to the footwear and/or to the ski or snowboard and to match this data with the measured force/area distribution. For example, a camera that records the ski or snowboard, the footwear, and/or the person from behind and/or from the front can be used to determine whether an inclination of the ski or snowboard in the transverse direction is caused by the ski or snowboard and/or the footwear or by the person's physiological characteristics. An asymmetric force/area distribution in the transverse direction, for example, could be caused by a lateral inclination of the lower leg, which can be identified by the camera recording. A front camera can be advantageously used to determine physiological characteristics of the person and to take these into account when optimizing the footwear and/or the ski or snowboard.

According to another variant of the invention the measuring system has at least one side-view camera to the side of the surface. The side-view camera is positioned such that it can be used to record the ski or snowboard, the footwear, and/or the person from the side. The side-view camera can thus determine in what area of the surface the ski or snowboard and the footwear are positioned. This enables a correlation to be made between the measured pressure distribution and the position of the ski or snowboard and/or footwear. The side-view camera can also be used to achieve a reproducible use of the measuring system, since in this way the stance of the person on the ski or snowboard can be determined and corrected on the basis of this recording. According to a preferred embodiment of the invention weight sensors are arranged between the ground and the surface. In particular, it is preferred if three to ten sensors are evenly distributed beneath the surface.

The weight sensors are useful for measuring the weight of the person and/or equipment. The weight measurement is used to calibrate the sensor area, with three to ten weight sensors preferably being needed in order to accurately determine the weight of the person and/or equipment. In particular, calibration is necessary if the sensitivity of the force sensors of the sections changes over time. In this embodiment of the invention, the computer compares the weight determined by the weight sensors with the sum of the forces measured over the sections. If there is a deviation, the force/area distribution is adjusted such that the sum of the outputted forces corresponds to the weight. Calibration using the weight sensors has the advantage that possible long-term effects that have an effect on the sensitivity of the force sensors of the surfaces are compensated for. As a result, the measuring system according to the invention provides reproducible measurement results with uninterrupted operation.

According to another embodiment the measuring system has a flat weighing unit. The weighing unit is used to calibrate the measuring system by determining the weight of the person and/or equipment before measuring the force/area distribution. The advantage of such a weighing device is that a reproducible measurement is continuously achieved by the calibration of the sensor plate.

Another variant of the invention is characterized in that the surface can be tilted by a device relative to a longitudinal and/or transverse axis. Due to the fact that the surface can be inclined relative to the horizontal, it is possible to simulate certain slopes of a ski run so that the pressure distribution of the ski can also be measured under realistic conditions. In particular, the inclination can be varied depending on the ski or snowboard being tested. For example, a cross-country ski is typically used at a low gradient, whereas a jumping ski is used at a high gradient.

According to another embodiment of the invention, at least a subset of the sections can be moved independently of one another substantially perpendicular to the surface. Movable sections make it possible to adapt the surface to different basic conditions. In particular, sections that, although lying below the ski or snowboard, are not in contact therewith due to an arcuate shape of the ski or snowboard, can be moved to a position in which they directly engage the ski or snowboard. The retraction of the sections thus enables the distance between the sliding surface and the original surface plane to be measured. This simultaneously provides information about the pressure distribution and the shape of the sliding surface of the ski or snowboard by a single measurement.

According to a variant that is based on this, the sections that can be moved substantially perpendicular to the surfaces can be tilted relative to a longitudinal and/or transverse axis. Since the individual sections can be tilted, it is possible for the surface to be fitted against the shape of the ski or snowboard, thus enabling largely gapless contact between the surface and the sliding surface to be achieved.

Another variant is characterized in that a surface that particularly has sliding properties corresponding substantially to those of snow is applied to the pressure plate. The measuring system is thus also suitable for cross-travel and can also be advantageously used for dynamic measurements of the handling.

In another embodiment of the invention, the sports equipment to be tested is the footwear, particularly a ski boot. In this embodiment, the pressure distribution generated by a ski boot is measured without a ski or snowboard. The ski boot is modified based on this pressure distribution measurement. In particular, the sole of the ski boot is changed in shape or some of the support surface is removed in order to achieve maximally homogeneous pressure distribution with the ski boot. In particular, the interaction between the two components can be identified by comparing the pressure distribution of the ski boot without a ski or snowboard and the pressure distribution of the ski or snowboard with ski boot.

The measuring system according to the invention is used in a method in such a way that at least one ski or snowboard or piece of sports equipment is placed with its sliding surface or support surface on a surface and partially loaded from above with a pressure that a person generates by his/her weight, that a force acting on a respective section is converted into an electrical signal, and that a computer determines a force distribution and/or pressure distribution that is exerted by the ski or snowboard on the surface from the electrical signal of the sections.

Such a method is used to determine, with the measuring system according to the invention, a spatially resolved force/area distribution and/or pressure distribution of a ski or snowboard in the longitudinal and transverse directions.

According to another embodiment of the method of the invention the force sensors measure the force acting on the sections for a predetermined period of time, with the computer particularly determining a pulse area distribution. Advantageously, the time interval is in a range from 0.1 ms to 100 ms and at a measurement frequency of from 10 Hz to 10 kHz in order to detect jump dynamics or skiing dynamics with the measuring system according to the invention. A measuring frequency of from 100 Hz to 10 kHz is especially preferred.

Advantageously, the measuring system according to the invention can be used for dynamic measurement. For example, by measuring a pulse area distribution, it is possible to test the dynamics when a ski jumper jumps and to modify the ski or snowboard and/or footwear based on the measured values in order to optimize the jump of the ski jumper.

According to a variant of the method according to the invention the stance of the person on the ski or snowboard is optimized before force, pressure, and/or pulse area distribution is determined. This is done particularly by comparing a photograph that is taken by the side-view camera of the person in a desired body position. This ensures that the person who is on the ski or snowboard assumes a stance that is typical for this ski or snowboard and/or for the person. Advantageously, the reproducibility of the measured pressure distributions is thus increased. Moreover, the stance of the person can be adjusted to the typical stance on the respective ski or snowboard.

In a supplementary embodiment of the invention, the comparison of the current stance of the person with the desired body position is carried out by overlaying the desired body position with the recording of the person. Based on the overlay with a desired body position, the person can correct his/her stance and match it with the desired body position. It is especially preferred that the recording of the person by the side-view camera be shown on a display that can the person himself can see and for the desired body position to be displayed in this recording, thus enabling the person to match his/her stance with the desired body position. Alternatively, an operator of the measuring system instructs the person to adjust his/her stance so that it matches with the desired body position. The fade-in of the desired body position can be preferably represented by an augmented reality method.

According to an alternative variant of the method, the surface is inclined relative to the longitudinal and/or transverse axis before the pressure distribution is determined. In this way, it is possible to move the surface into a position corresponding to the run for which the ski or snowboard can typically be used. For example, a slope angle be set that corresponds to the slope of a ski jump in order to optimize the pressure distribution of a jumping ski.

According to another alternative variant of the method the sections are moved perpendicular to the surface until all of the sections lying below the ski or snowboard directly engage the ski or snowboard. In particular, the distance that the sections must travel in order to directly engage the ski or snowboard is measured. In this way, it is possible to measure not only the pressure distribution but also the shape of the ski or snowboard under load. In particular, the shape of the ski or snowboard can be measured where the bias of the ski or snowboard is so great that it would not directly engage it when resting on a flat surface.

According to another embodiment of the invention, the footwear is adjusted during leveling based on the force, pressure, and/or pulse area distribution determined by the computer. In particular, the angular position of a binding is varied such that the pressure distribution is optimized. Moreover, leveling can also be performed by inserting individually adapted and/or selected surface elements such as wedges or insoles.

Alternatively, the pressure distribution of the ski or snowboard can also be varied and adapted to the skier or snowboarder by biasing the ski or snowboard on the basis of the determined force, pressure, and/or pulse area distribution.

In this way, the measuring system according to the invention can be used to individually customize and optimize footwear for a skier or snowboarder. For example, by changing the footwear, in particular a binding, an angular position of the lower legs can be corrected so that the pressure distribution to the transverse axis is largely homogeneous. This approach offers the advantage that the footwear can be individually customized for the customer right in the sporting goods store and ski shop.

In a preferred embodiment, the angular position of the binding is corrected on the basis of previously determined transverse pressure distribution by varying the angular position of the binding until a minimum imbalance of the transverse pressure distribution is achieved. Preferably, the transverse pressure distribution is recorded where the footwear rests on the surface. By considering the transverse pressure distribution, the angular position of the engagement can be easily and immediately corrected based on the pressure distribution measurement.

According to an especially preferred embodiment of the invention, the sliding surface of the ski or snowboard is altered locally by local removal of material from the underside of the ski or snowboard on the basis of the force, pressure, and/or pulse area distribution determined by the computer. The determination of the force, pressure, and/or pulse area distribution thus makes it possible to customize the sliding surface individually to the person and thus to substantially improve the handling characteristics of a ski or snowboard. In particular, it is possible in this way to achieve the most homogeneous pressure distribution possible.

According to an alternative embodiment of the invention, the sliding surface of the ski or snowboard is altered locally by changing the local thickness, surface structure, and/or composition of an outer coating on the basis of the force, pressure, and/or pulse area distribution determined by the computer.

By changing the outer coating, which is typically formed by a wax layer, it is possible to optimize the ski or snowboard individually. For example, a local variation of the coating in cross-country skis enables the sliding surface to be optimized both during gliding and descents. To wit, the front and rear areas of cross-country skis are typically smooth, while the middle area is provided with so-called climbing aids. Based on the measurement of the force/area distribution, the smooth sections and the climbing aids can be distributed optimally and individually on the sliding surface.

A preferred variant of the invention is characterized in that material is first removed from the underside of the ski or snowboard in the area of the ski or snowboard in which a pressure limit is exceeded, that the resulting pressure distribution is then measured again, and that outer coating is applied as soon as no area of the ski or snowboard exceeds the pressure limit value. Such an iterative process ensures that the areas in which an above-average pressure load is present are first processed by removing material and that an outer coating, which can also be varied locally, is applied only then. Advantageously, pressure differences that would not be compensated for by a change to the outer coating are reduced by the removal of material. The thickness and/or composition of the surface structure of the final outer coating that is applied can be varied locally in order to achieve better handling characteristics.

According to a supplementary variant the surface structure of the outer coating is modified during a polishing step. In particular, microstructures are imprinted by a laser that cause the properties of the coating to vary locally. These micro- and/or nanostructures change the friction of the outer coating on a water film and thus enable individual customization of the handling characteristics of the ski or snowboard.

According to another variant of the invention the force, pressure, and/or pulse area distribution is used to determine a deformation of the ski or snowboard, with a tilt, penetration depth, torsion, and/or flexion of the ski or snowboard being determined in particular.

The precisely spatially resolved measurement of the force, pressure, and/or pulse area distribution makes it possible to directly measure deformations of the ski or snowboard. Advantageously, the measuring system according to the invention can be used in the production of a ski or snowboard, in which case the ski or snowboard is loaded with a defined pressure, and the force/area distribution enables any deformation of the ski or snowboard under load to be determined. For instance, torsion of the ski or snowboard becomes visible since the force/area distribution in the front part of the ski or snowboard has its maximum on a different side than at the rear part of the ski or snowboard in the transverse direction. It is also possible in this way to measure especially desirable pressure zones that decisively influence the handling characteristics of an alpine ski to be measured with a high spatial resolution. For example, so the so-called rocker effect can be measured and/or influenced.

According to an especially preferred embodiment of the invention the force, pressure, and/or pulse area distribution is recorded and compared at time intervals. It is thus possible to make symptoms of wear measurable with the measuring system. Advantageously, targeted repairs can be made on the basis of the measurements. Changes in people's physiology over time can also be determined with the measuring system.

Another variant of the invention is characterized in that the measuring system has at least one inertial sensor possibly mounted at least on one ski or on a snowboard and connected to the computer via an electrical line or radio. This inertial sensor that can be mounted on a ski or snowboard can determine a tilt and/or an acceleration of the ski or snowboard independently of the determination of a force, pressure, and/or pulse area distribution. This has the advantage, for example, that the pressure distribution of the ski or snowboard can be determined in a predetermined angular position. Particularly in the testing of a ski or snowboard whose handling characteristics are determined by a pressure distribution at the edges, as is the case with carving skis, for example, this is advantageous because the ski or snowboard can be examined at a defined angle. In an advantageous variant of the invention, the inertial sensor can be used to measure the individual maneuvering characteristics of a person skiing outside the store and, based on this measurement and in combination with a measurement of the force, pressure, and/or pulse area distribution, provide an ideal ski customized for the person.

In another variant of the invention, the force, pressure, and/or pulse area distribution that the measuring system determines is used as input parameters for a simulation device and/or a game console. Such an embodiment of the invention enables a simulation device to be controlled using the measuring system according to the invention. For example, the measuring system could be used to control a computer game. In particular, this embodiment of the invention is suitable for optimizing the skier's comfort with the handling and, for example, to specifically improve the jumping of a ski jumper.

According to another embodiment of the invention, a center of gravity in the distribution is determined at defined time intervals from the force and/or pressure distribution. A person's deviation and thus his/her stability on the ski or snowboard relative to the surface can thus be determined. This indication can be advantageously used to appropriately combine a ski or snowboard with footwear in order to identify a customized and maximally stable configuration for the person.

According to an alternative variant of the invention in addition to the previously described methods, a customization or selection of the footwear is performed in advance, in which case an individual measurement is made of the pressure distribution without ski or snowboard and footwear, barefoot, for example. Based on the pressure distribution, an sole of the footwear is adapted or, if necessary, a preferred footwear is selected.

An embodiment of the invention is described in greater detail below with reference to figures.

Figure 2:
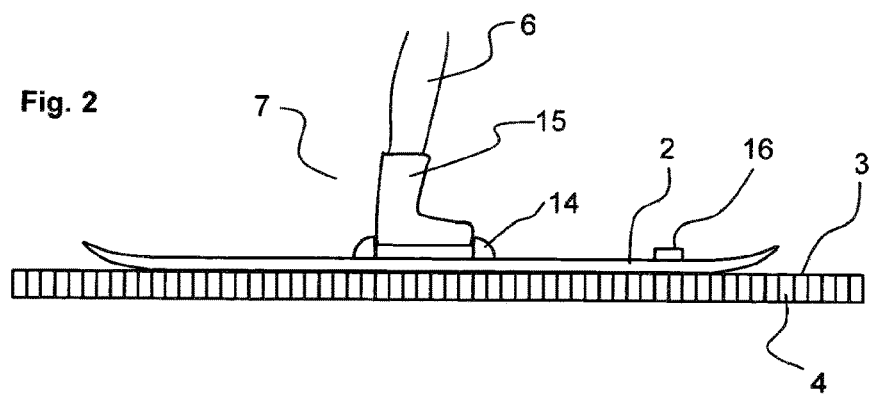
Figure 3:
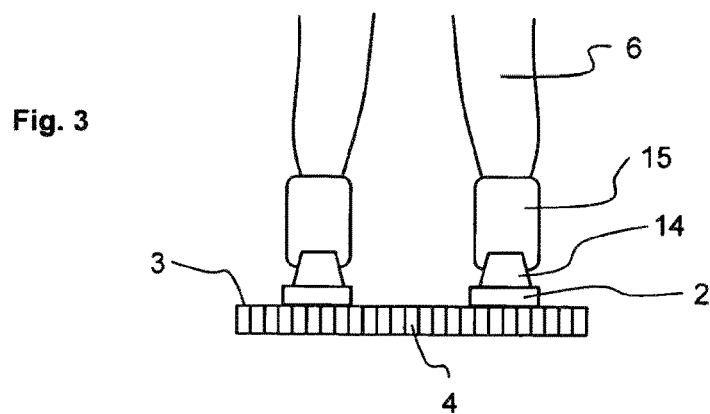
Figure 6:
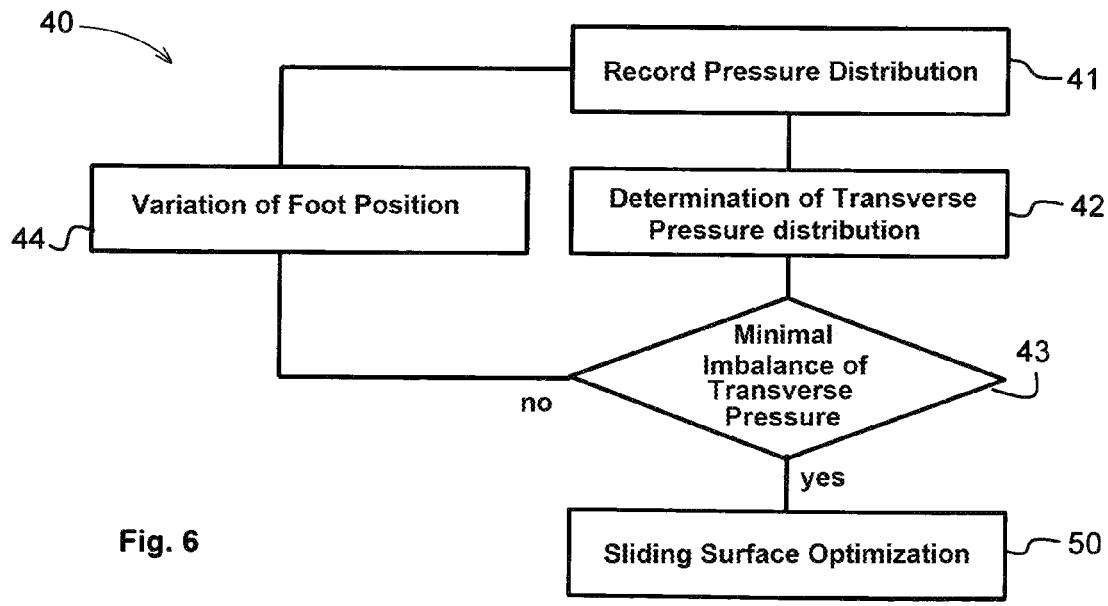
Figure 7:
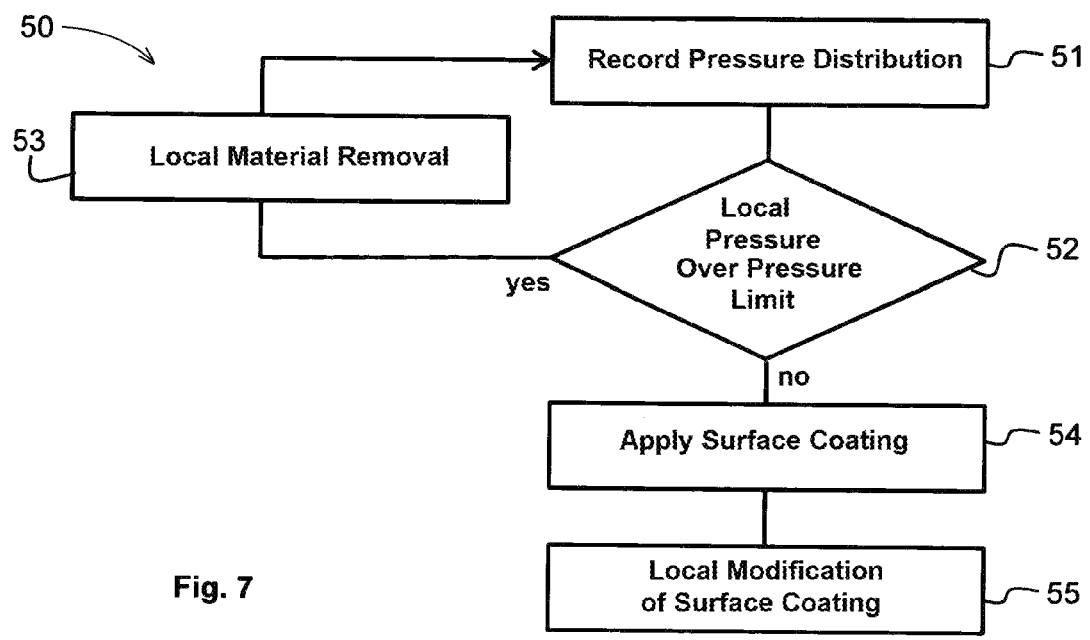

FIG. 1 is a perspective view of an embodiment of the measuring system according to the invention, FIG. 2 is a schematic side view of a portion of the measuring system, FIG. 3 is a schematic rear view of a portion of the measuring system, FIG. 4*a* is a flowchart showing the preferred sequence of process blocks, FIG. 4*b* is a flowchart with additional sensor-surface angle adjustment and sensor-surface shaping, FIG. 5 is a flowchart of a method of optimizing a person's stance, FIG. 6 is a flowchart of a method of correcting the binding setup, and FIG. 7 is a flowchart of a method of optimizing sliding surfaces.

In FIG. 1, an embodiment of the measuring system 1 according to the invention for testing a ski or snowboard 2 is shown in a perspective view. The measuring system 1 comprises a surface 3 at least mostly subdivided into a plurality of sections 4. The sections 4 are distributed over the entire surface 3 in the longitudinal and transverse directions, with only some of the sections 4 being shown in FIG. 1 for the sake of clarity. Each of the sections 4 has a force sensor that outputs an electrical signal that corresponds corresponding to a force acting on the section 4 signal and that is evaluated by a computer 5. By virtue of the flat distribution of the sections 4 over the surface 3, it is possible to use the computer 5 to determine the force/area distribution and/or pressure area distribution generated by the ski or snowboard that is placed on them.

As shown in the embodiment of FIG. 1, the ski or snowboard 2 is partially loaded with a pressure that is produced by the weight of a person 6. In this way, the measuring system 1 enables the individual measurement of a force/area distribution and/or pressure area distribution of the person 6 in combination with a ski or snowboard 2. This makes it possible to make an individual determination about whether a ski or snowboard 2 is suitable for the person 6. In addition, the measured force/area distribution can be used to customize the ski or snowboard for the person.

The ski or snowboard 2 has at least one piece of footwear 7 that receives a foot of the person 6. As shown in FIG. 1, the footwear 7 is preferably a ski boot. The ski or snowboard 2 is a pair of skis in this embodiment. The measuring system 1 makes it possible to measure a force/area distribution and/or pressure area distribution that is caused by the combination of the person 6, the footwear 7, and the ski or snowboard 2. An optimal combination of ski or snowboard 2 and footwear 7 is therefore determined individually for the person 6 on the basis of the measured force/area distribution. A measuring system 1 such as that shown in FIG. 1 can thus be advantageously used in a sporting goods store or ski shop, with it being possible for an optimal solution to be determined metrologically on the spot for the customer. The measured force/area distribution and/or pressure area distribution can also be used to customize the ski or snowboard 2 and/or the footwear 7 for the person.

FIG. 2 shows a portion of the measuring system 1 in a side view in the longitudinal direction. The measuring system 1 comprises the surface 3 subdivided into a plurality of the sections 4. The sections 4 are distributed over the entire surface 3 in the longitudinal direction. Each of the sections 4 has a force sensor that outputs an electrical signal that corresponds to a force acting on the section 4 and that is evaluated by the computer 5. In the ski or snowboard 2, the footwear 7 is preferably a binding 14 that is in contact with the ski or snowboard 2, and a boot 15. The measured force, pressure, and/or pulse area distribution serves as a basis for individualized adaptation of the binding 14 and/or boot 15 to the person 6 and/or ski or snowboard 2.

The surface 3 has a longitudinal length of from 75 cm to 300 cm and a transverse width of from 40 to 150 cm. Such a surface makes it possible to position and measure a typical ski or snowboard 2. In particular, alpine skis, cross-country skis, snowboards, or jumping skis can be tested on the surface 3. The surface 3 preferably has 8 to 500 surface sensor sections 4 per $dm^2$, although it has been found that 20 to 200 surface segments per $dm^2$ are especially preferred. Such a section density enables sufficient spatial resolution of the force/area distribution in the longitudinal and transverse directions.

The sections 4 are preferably rectangular or square and have a width of from 1 mm to 30 mm. Each section 4 has at least one capacitance force sensor, resistive force sensor, piezoelectric force sensor, and/or thin-film force sensor. Such sensors enable a reliable and robust design of the force sensors with a level of sensitivity that is sufficient to measure typical pressures exerted on the sliding surface of the ski or snowboard 2. The pressure resolution of the surface 3 is preferably in the range from 0 to 80 $N/cm^2$, more preferably no more than 40 $N/cm^2$, in order to optimally detect the pressures on a sliding surface of a typical ski or snowboard 2 under the load of an average person.

As shown in FIG. 1, the measuring system 1 has the computer 5 that is connected to a controller and a first display 8a. The first display 8a is used to output the force/area distribution in the immediate vicinity of the surface 3. As a result, it is advantageously possible to make immediate, individualized suggestions on the spot in sporting goods stores and to select a suitable ski or snowboard 2 for the person 6. The measuring system 1 preferably has a second display 8b laterally in front of the surface 3 in the longitudinal direction, with a normal of the display surface of the display 8b being oriented perpendicular to the surface toward the person 6. In this way, the display 8b is visible to the person 6 so that he/she can see a measured pressure surface distribution or other information directly. In an alternative embodiment, the second display can be a projection or other display option.

As shown in FIG. 1, the measuring system also has a segmented lighting element 9 extending longitudinally next to the surface 3, preferably in a frame 10. The segmented lighting element 9 can be used to display a desired position for the ski or snowboard 2 and/or footwear 7 optically by color and/or intensity variation. In addition, the segmented lighting element 9 can be used to display the peak of the force, pressure, and/or pulse areas in the longitudinal direction, for example.

The embodiment of the measuring system 1 shown in FIG. 1 also has a projector 11 that projects an image onto the surface 3. The projector 11 can be used to represent a desired position for the ski or snowboard 2 and/or footwear 7. Moreover, it is possible to use the projector 11 to project the measured force, pressure, and or pulse area distribution directly onto the surface 3 and thus make it more visible for the person 6 and/or a salesperson.

The measuring system 1 shown in FIG. 1 has at least one front camera 12a that is preferably positioned laterally next to the surface 3 and is aimed at at least one ski or snowboard 2, the footwear 7, and/or the person 6. The front camera 12a is preferably oriented in the longitudinal direction of the surface 3 so that it records the skis or snowboard 2, the footwear 8, and/or the person 7 from the front and/or from the rear. Such an arrangement of the front camera 12a makes it possible to combine the measured force, pressure area distribution, and/or pulse area distribution with the camera recording. Furthermore, the measuring system 1 has an additional side-view camera 12b that is set up to record the person 6 from the side. The side-view camera 12b is preferably used to determine the body position of the person 6 on the ski or snowboard 2 and to compare it with a desired body position.

FIG. 3 is a rear view of a portion of the measuring system 1. In a preferred embodiment, this view corresponds schematically to the recording of the front camera 12a, which is in the position shown in FIG. 1. Based on the recording of the front camera 12a, for example, it can be ascertained whether an asymmetrical force, pressure, and/or pulse area distribution in the transverse direction is caused by physiological properties of the person 6, by the setup of the footwear 7, and/or by deformation of the ski or snowboard 2. The footwear 7 is a binding 14 and a boot 15. For example, the camera recording can be used to measure a possible lateral inclination of the lower leg and/or of the boot and to take it into account in the consultation.

FIGS. 1 and 2 show an embodiment of the measuring system 1 according to the invention that has an additional inertial sensor 16. At least one inertial sensor that can be mounted on a ski or snowboard 2 can determine a tilt and/or an acceleration of the ski or snowboard 2 independently of the determination of a force, pressure, and/or pulse area distribution. For example, the pressure distribution at a certain angle of attack as measured by the inertial sensor can be examined in a simple manner, thus enabling the handling characteristics of skis or snowboards 2 to be tested whose handling characteristics are determined primarily by a pressure distribution at the edges, as is the case with carving skis, for example.

The measuring system 1 shown in FIG. 1 has a flat weighing unit 13 that is used for calibrating the sensor area. For this purpose, the person first stands on the flat weighing unit 13 and is thus weighed. The person 6 then stands on the surface 3 with the ski or snowboard 2. The total force measured by the surface 3 should correspond to the weight determined by the weighing unit 13. If this is not the case, the force, pressure, and/or pulse area distribution must be adjusted. Such a calibration enables continuous, reproducible measurement of the force, pressure, and or pulse area distribution.

In an unillustrated variant of the invention, the measuring system has weight sensors between the bottom and the surface 3. It has been found that three to ten sensors should be preferably distributed under the surface 3 in order to achieve an accurate weight measurement. The weight measurement is used for calibrating the surface so that the force/area distribution can be determined in a continuous, reproducible manner. A weight determination during the measurement of the force, pressure, and/or pulse area distribution makes it possible to calibrate the measurement while the surface is loaded with the ski or snowboard and the skier and thus compensates for temporary fluctuations in the sensitivity of the sensor elements of the sections.

In another unillustrated variant of the invention, the measuring system 1 has a surface 3 that can be tilted by a tilting device relative to a longitudinal axis and/or transverse axis. The tilting device can be driven by electromechanical, hydraulic, or pneumatic means, for example. The tilting device should be set up such that it can tilt the surface 3 as required relative to the longitudinal axis and/or transverse axis of the measuring system 1. As a result, the inclination of the surface 3 can be adapted to the desired application, so the pressure distribution in a simulated slope angle on a ski run can be measured. The typical slope situation may vary depending on the ski or snowboard and where it is used. For example, the typical slope is much less for cross-country skiing than it is for ski jumping. Furthermore, by inclining the surface 3 and the recording by the side-view camera 12b, the stance of the person 6 can be optimized and an optimal position on the ski or snowboard achieved for preferred slopes. Advantageously, it is possible not only to customize the ski or snowboard 2 to the physiology of the person 6, but also to achieve an optimization with regard to a preferred slope.

Another unillustrated embodiment of the invention is characterized in that at least a subset of the sections can be moved independently of one another substantially perpendicular to the surface. The sections 4 can be moved perpendicular to the surface 3, for example by a pneumatic cylinder, a spring whose deflection can be controlled, or by another electromechanical device. The distance through which the sensor-surface segments 4 are moved in order to contact the sliding surface of the ski or snowboard 2 is measured. It is thus possible to scan the parts of the ski or snowboard 2 that otherwise do not directly engage the flat surface 3 due to a bias of the ski or snowboard 2. Consequently, in addition to measuring the pressure distribution, it is also possible to use a measurement of the deformation of the ski or snowboard 2 under the load of a person 6 in order to optimize the ski or snowboard 2, the footwear 7, and/or the stance of the person 6 on the basis of this information. Preferably, the sections 4 that are movable perpendicular to the surface 3 can be tilted relative to a longitudinal and/or transverse axis of the measuring system 1. As a result, the surface 3 is able to fit against the sliding surface of the ski or snowboard 2, thereby establishing contact between the surface 3 and the ski or snowboard 2 over the entire surface of the ski or snowboard 2.

FIG. 4a shows a flowchart of a variant of the method according to the invention in which stance optimization 20 of the person 6 is first performed, followed by leveling 40 and, finally, sliding-surface optimization 50. The individual process blocks of stance optimization 20, foot-position correction 40, and sliding-surface optimization 50 are considered independently and can be changed in order or omitted as needed. During the typical use of the measuring system 1 in a retail store, however, the method sequence as shown in FIG. 4a is preferred, since the stance optimization 20 of the person 6 takes place prior to the recording of a pressure distribution in order to ensure that the person 6 is in a stance that is typical for the use of the ski or snowboard 2 and that the pressure distribution is determined for the corresponding application of the ski or snowboard. For example, the stance on a cross-country ski differs significantly from the stance on a jumping ski.

In addition, experience has shown that, in a showroom, people 6 typically choose a stance that does not correspond to the stance on a run under real conditions. Once the stance of the person 6 has been optimized, then the foot position 40 can be corrected, in which, for example, the binding 14 is initially set such that a transverse pressure distribution along the transverse axis of the skis or snowboards 2 is as constant as possible over the entire extension of the ski or snowboard 2 in the transverse direction, particularly at the position of the footwear 7. Once the foot-position correction 40 has been performed, it is possible to continue on to sliding-surface optimization 50, in which the sliding surface of the ski or snowboard 2 is altered locally on the basis of the pressure distribution determined by the computer 5 in order to customize the handling characteristics of the ski or snowboard 2 for the person 6. After the process blocks have been carried out, the ski or snowboard 2 is optimally customized for the person 6 in the sense of the invention.

FIG. 4b shows an expansion of the method illustrated in FIG. 4a, with the method being supplemented by the process blocks sensor-surface angle adjustment 31 and sensor-surface shaping 32. In principle, these process blocks are implemented independently of one another and can be used as needed. In the method illustrated in FIG. 4b, the sensor-surface angle adjustment 31 is performed prior to the stance optimization 20, in which the inclination of the surface 3 is changed relative to a longitudinal and/or transverse axis of the measuring system 1. By changing the inclination, the typical slope when using a ski or snowboard 2 can thus be simulated and the pressure distribution measured under realistic conditions, for example. After the inclination of the surface 3 has assumed the desired value, the stance of the person 6 is corrected in the stance optimization step 20 in order to achieve a stance that is typical for the corresponding slope. Once the stance of the person 6 has been optimized, it can be advantageous in the variant of the method according to the invention shown in FIG. 4b to perform sensor-surface shaping 32 whereby the surface 3 is deformed by displacement of the sections 4 in such a way that it engages the entire sliding surface of the ski or snowboard 2. In this way, in addition to determining the pressure distribution, the deformation of the ski or snowboard 2 can be determined by measuring the distance by which the sections 4 must be moved in order to directly engage the ski or snowboard 2. As needed, it can also be advantageous to perform the sensor-surface shaping 32 after foot-position correction 40 or during sliding-surface optimization 50.

FIG. 5 shows in the process of stance optimization 20 in detail. First, a camera recording 21 is made of the subject person 6 by the side-view camera 12b. In the method step 20 of target/stance comparison, the stance of the person 6 on the ski or snowboard 2 is compared with a desired body position. If there is no match between the current stance of the person 6 and the target body position, the person 6 must change his/her stance until a match is achieved. The stance change 23 of the person 6 is recorded by the camera recording 21. If there is a match between the stance of the person 6 and a desired body position, it is possible to proceed with the recording of pressure distribution. Preferably, the comparison 22 of the current stance of the person with the desired body position is performed by overlaying the desired body position with the recording of the person 6. The camera recording of the side-view camera 12b as well as the desired body position that is faded in are preferably displayed by the second display 8b, thus enabling the person 6 to match his/her stance with the desired body position to the greatest possible extent.

FIG. 6 shows the process block of foot-position correction 40 in detail. First, a recording is made of the pressure distribution 41. The transverse pressure distribution 42 is then determined, with this transverse pressure distribution being carried out in the transverse direction of the ski or snowboard 2 at the position of the footwear 7. Based on the determined pressure distribution, a determination is made in the context of an imbalance comparison 43 whether there is an imbalance in the pressure distribution and whether a certain limit value between the maximum and the minimum value is being undershot. If this is not the case, then a variation 44 of the foot position, particularly the binding angle, is performed and another recording is made of the pressure distribution 41. The level variation 44 is performed until a minimum value is reached for the imbalance of the transverse pressure distribution. If this is the case, then it is possible to proceed to the sliding-surface optimization 50.

A preferred sliding-surface optimization 50 is shown in detail in FIG. 7. First, the recording is made of a pressure distribution 51. Then, in the method step 52 of local pressure comparison, a determination is made whether the pressure generated locally by the ski or snowboard 2 exceeds the impression limit value. If the pressure value is exceeded, material removal 53 is performed locally. This can be performed by a grinding wheel, for example, in which case the grinding wheel has a width that is greater than the extension of the ski or snowboard 2 in the transverse direction so that a removal depth can be varied only in the longitudinal direction. A removal method is preferably used in which the material removal depth can be varied locally both longitudinally and transversely of the ski or snowboard 2. In this way, a homogeneous pressure distribution can be achieved in the transverse direction as well. If the local pressure is below the limit value, an application 54 of a surface layer is performed. This surface layer is preferably wax that decisively influences the sliding properties of the ski or snowboard 2. According to the invention, the thickness, surface structure, and/or composition of the outer coating is altered locally, with this variation being carried out on the basis pressure distribution determined by the computer 5. Finally, a local modification of the surface structure 55 can be performed as needed. Upon completion of the sliding-surface optimization 50, the properties of the sliding surface of the ski or snowboard 2 are optimized to the extent that an optimum pressure distribution exists on the sliding surface of the ski or snowboard 2 for the specific person 6 for the respective ski or snowboard 2 with footwear 7 and binding 14.

The measuring system according to the invention and the measuring method enable testing and customization of a ski or snowboard and/or footwear by reproducible determination and evaluation of a force, pressure, and/or pulse area distribution of a loaded ski or snowboard with a high spatial resolution in the longitudinal and transverse directions of the ski or snowboard.

| List of reference symbols | |
|---|---|
| 1 | measuring system |
| 2 | ski or snowboard |
| 3 | surface |
| 4 | section |
| 5 | computer |
| 6 | person |
| 7 | footwear |
| 8a | control I first display |
| 8b | second display |
| 9 | lighting element |
| 10 | frame |
| 11 | projector |
| 12a | front camera |
| 12b | side-view camera |
| 13 | weighing unit |
| 14 | binding |
| 15 | boot |
| 16 | inertial sensor |
| 20 | stance optimization |
| 21 | camera recording |
| 22 | target stance comparison |
| 23 | stance change |

| List of reference symbols | |
|---|---|
| 31 | sensor-surface angle adjustment |
| 32 | sensor-surface shaping |
| 40 | leveling |
| 41 | recording of pressure distribution |
| 42 | determination of the transverse pressure distribution |
| 43 | imbalance comparison |
| 44 | level variation |
| 50 | sliding-surface optimization |
| 51 | recording of pressure distribution |
| 52 | local pressure comparison |
| 53 | local removal of material |
| 54 | application of an outer layer |
| 55 | local modification of the surface structure |

The invention claimed is:

1. A method of using a measuring system having:
a sensing apparatus having a sensor surface subdivided into a plurality of longitudinally and transversely subdivided sections onto which a ski or snowboard can be placed;
a respective force sensor on each the sections that outputs an electrical signal that corresponds to a force applied by the ski or snowboard to the respective section; and
a computer connected to the force sensors for receiving the electrical signals therefrom,
the method comprising the steps of:
placing the ski or snowboard with its sliding surface on the sections of the sensor surface and thereby loading the sections of the sensor surface with forces that a person atop the ski or snowboard generates by his/her weight such that the force acting on each section is converted into a respective electrical signal,
inclining the surface relative to a longitudinal and/or transverse axis of the sensor surface before the force distribution is determined, and
determining from the electrical signals with a computer a distribution of the forces exerted by the ski or snowboard on the surface over an area of the sensor surface.

2. The method according to claim 1, wherein the force sensors measure the forces acting on the sections during a discrete period of time and the computer determines a pulse area distribution therefrom.

3. The method according to claim 1, further comprising the step, before the determination of the force distribution, of:
optimizing a stance of the person on the ski or snowboard by comparison of a recording of the person taken by a side-view camera with a desired body position.

4. The method according to claim 3, wherein the comparison of the current stance of the person is made with the desired body position by overlaying the desired body position with the recording of the person, thus enabling the person to match his/her stance with the desired body position.

5. The method according to claim 1, further comprising the step of:
moving the sections perpendicular to the surface until all of the sections lying below the ski or snowboard directly engage the ski or snowboard.

6. A method of using a measuring system having:
- a sensing apparatus having a sensor surface subdivided into a plurality of longitudinally and transversely subdivided sections onto which a ski or snowboard can be placed;
- a respective force sensor on each of the sections that outputs an electrical signal that corresponds to a force applied by the ski or snowboard to the respective section; and
- a computer connected to the force sensors for receiving the electrical signals therefrom, the method comprising the steps of:
- placing the ski or snowboard with its sliding surface on the sections of the sensor surface and thereby loading the sections of the sensor surface with forces that a person atop the ski or snowboard generates by his/her weight such that the force acting on each section is converted into a respective electrical signal,
- determining from the electrical signals with a computer a distribution of the forces exerted by the ski or snowboard on the surface over an area of the sensor surface, and
- on the basis of the force distribution determined by the computer, adjusting for a foot position of the person by altering an angular position of a binding securing a foot of the person to the ski or snowboard and/or by putting a modified sole in or on footwear worn by the person on the ski or snowboard.

7. The method according to claim 6, wherein the correction of the foot position is performed on the basis of a previously determined transverse pressure distribution, with the angular position of the binding being particularly varied until a minimum imbalance of a transverse pressure distribution is achieved.

* * * * *